July 5, 1949.　　　　L. L. WHITNEY　　　　2,475,167
BRAKE BEAM AND METHOD OF MAKING
Filed Sept. 26, 1947

INVENTOR.
Loren L. Whitney
BY

Patented July 5, 1949

2,475,167

UNITED STATES PATENT OFFICE 2,475,167

BRAKE BEAM AND METHOD OF MAKING

Loren L. Whitney, Hammond, Ind., assignor to American Steel Foundries, Chicago, Ill., a corporation of New Jersey Application September 26, 1947, Serial No. 776,306

12 Claims. (Cl. 188—228)

This invention relates to brake beams for railway brake equipment and method of making the same.

The general object of the invention is to design a brake beam which may be economically manufactured and possess the requisite strength for withstanding the severe stresses imposed by railway braking conditions.

A specific object of the invention is a novel method of manufacturing a brake beam by means of which the compression and tension members may be welded to each other economically and without the use of special equipment and chill blocks.

Another object of the invention is to devise a brake beam wherein the ends of the tension members are received for welding in pockets formed in a wall of the compression member and welded to said wall in a substantially straight line weld.

A different object is to provide a cheap, rapid and effective method of welding the tension and compression members which will utilize material heretofore removed in producing the desirable strength at the weld joint.

A further object of the invention is to provide a process by which the joint between the tension and compression members may be made as strong as the materials welded together, thus giving a joint of one hundred per cent strength or better, if desired, without using large amounts of welding material.

These and other objects of the invention will be apparent from the specification and the drawings, wherein.

Figure 1:
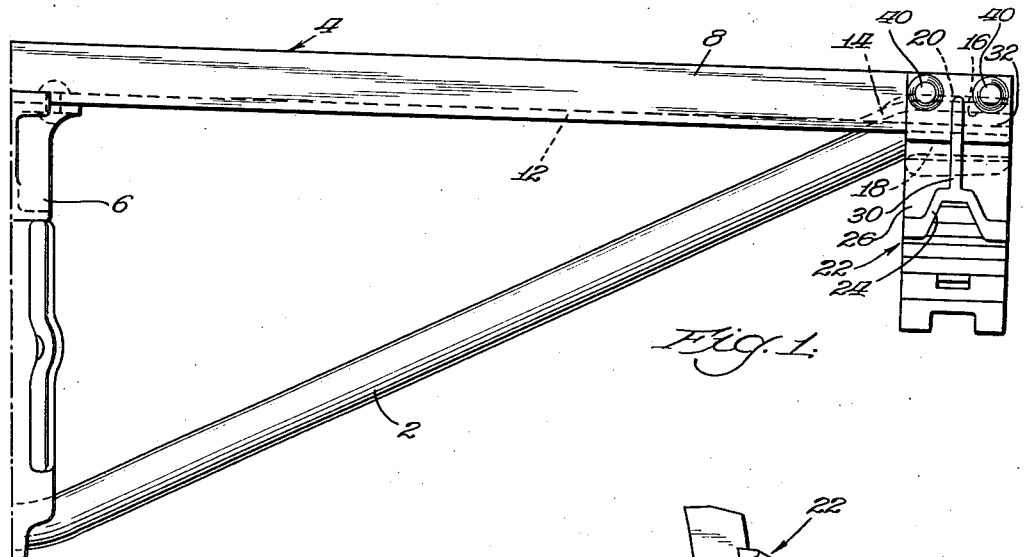
Figure 1 is a fragmentary top plan view of a brake beam constructed in accordance with this invention, one end portion being shown inasmuch as the beam is symmetrical about its transverse center line.
Figure 5:
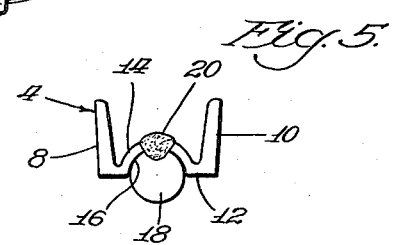
Figures 3 to 6 illustrate an end portion of the truss structure of the brake beam shown in Figures 1 and 2, Figure 3 being a top plan view thereof, Figure 4 a rear view, Figure 5 an end view, and Figure 6 a sectional view taken in the transverse vertical plane substantially as indicated by line 6—6 of Figure 4.

Describing the invention in detail, the brake beam comprises tension and compression members generally designated 2 and 4, respectively, and a strut 6 connected therebetween at the transverse center line of the beam, said strut being formed and arranged for connection in conventional manner to an associated brake lever (not shown).

The compression member 4 is of U section with flat top and bottom walls 8 and 10 and an intervening front wall 12 which is flat throughout its length with the exception that each end portion 14 is of arcuate section curved transversely of the compression member, the arcuate section being formed by depressing each end portion 14 inwardly medially between the top and bottom webs 8 and 10 to form a longitudinal semicylindrical socket 16 extending inwardly from the extremity of said front wall 12. The tension member 2 is of round bar section throughout its length and is of a diameter slightly less than that of said semicylindrical socket or pocket, and has at each extremity thereof a bent end 18 extending generally parallel to the adjacent portion of said front wall 12. The end 18 is inserted into the adjacent socket 16 and is welded as at 20 to the associated end portion 14 of said front wall, as hereinafter described. It will be noted that the front portion of the end 18 extends forwardly of the front wall 6 of the compression member.

Figure 2:
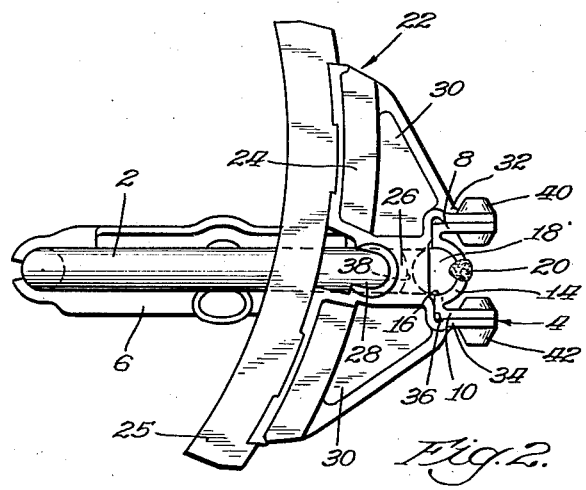
Figure 2 is an end view of the structure shown in Figure 1.

A brake head, generally designated 22, is mounted at each end of the beam, said head comprising a front wall 24 to which is secured a brake shoe 25 (Figure 2) by a key (not shown) in the conventional manner. The head has a center portion 26 connected to said front wall intermediate its ends and extending rearwardly thereof.

Within the portion 26 is formed a hanger socket 28 open through the wall 24 for reception of a hanger (not shown), the hanger serving to suspend the beam from the associated truck frame (not shown) in the usual manner.

The sections of the front wall above and below portion 26 are additionally connected to said portion 26 by top and bottom substantially vertical ribs 30, 30 which also merge with spaced top and bottom webs 32 and 34 integral with said portion 26 and extending from the top and bottom sides of said portion 26 rearwardly thereof. The webs 32 and 34 define with the rear extremity of said portion 26 a cavity 36 therebetween for reception of the associated end 18 of the tension member and adjacent portion of the compression member for mounting the head on the beam. The rear side of the portion 26 is recessed as at 38 sufficiently to accommodate the portion of the end 18 protruding forwardly of the front wall 12 of the compression member.

The head is secured to the compression member by rivets 40 extending through aligned holes in webs 32 of the head and wall 8 of the compression member and by rivets 42 extending through aligned holes in web 34 of the head and wall 10 of the compression member.

In fabricating this novel brake beam, the front wall 12 of the compression member 4 is depressed between the top and bottom walls 8 and 10 into arcuate section at each end thereof to form the sockets 16. This may be done by means of any suitable press or the like.

Each end 18 of the tension member is bent to approximately a plane paralleling that of the adjacent portion of the front wall 12 and is seated in the associated socket 16. Inasmuch as the diameter of the socket is slightly greater than that of the tension member bar, the end 18 thereof will seat tangentially against the semicylindrical portion 14 forming the socket 16, that is, there will be line engagement longitudinally of the compression member between the portion 14 and the rear side of end 18, as may readily be seen in Figure 6.

Figure 6:
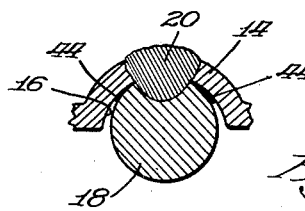
Figure 4:
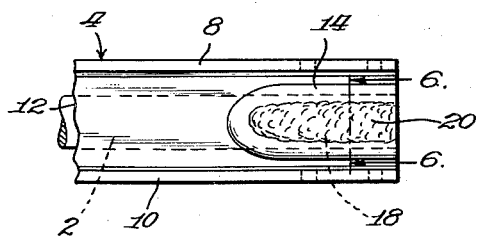
Figure 3:
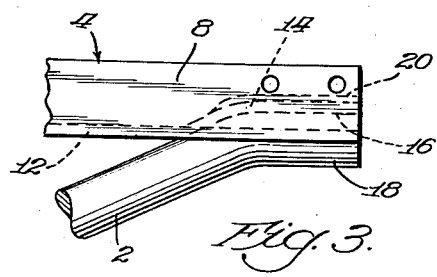

Each end 18 and associated portion 14 are then welded together in a straight line along the line engagement therebetween, the welding operation causing the portion 14 and end 18 to melt and fuse at their points of engagement. By welding in this manner, the usual chill back-up bars are eliminated since any metal that runs off will flow in a thin sheet, as seen in Figure 6 at 44, 44, between the outer surface of end 18 and the inner surface of pocket 16, which are nonconcentric. The thin sheet of run-off metal will chill rapidly and, upon chilling, will act as a seal to prevent further run-off. In welding as heretofore described, the welding arc burns through the portion 14 into the round rod tension member, using only a small amount of welding rod, the operation is simplified and simple equipment can be used. Also, the weld is shortened, saving time and labor without sacrificing any strength in the connection between the compression and tension members.

After welding these members, the heads are mounted on the beam and connected by the rivets 40 and 42 as hereinbefore described.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. The method of fabricating a brake beam truss structure comprising the steps of deforming the end portions of a front wall of a channel-section compression member of substantially uniform cross section throughout its length to form U-section pockets in said wall, then bending the extremities of a round bar tension member of generally constant cross section throughout its length to provide end sections extending longitudinally generally parallel to said wall, then inserting an end section into each pocket against the adjacent surface of the related portion, and then securing each end section to the adjacent portion within the related pocket by welding through the sides of said portions remote from said sections to fuse the abutting sections and portions into a unitary structure.

2. The method of securing the ends of a round bar tension member and a U-section compression member of a truss type brake beam, comprising the steps of upsetting the ends of one of the walls of the compression member to form pockets extending from the extremities of said wall longitudinally inwardly thereof and curved transversely of said compression member and of a diameter slightly larger than that of said tension member, bending the ends of the tension member to a position substantially longitudinally of the compression member, seating said tension member ends tangentially against said wall longitudinally thereof within the respective pockets, and fusing said tension member ends to said wall in said pockets by welding through said wall substantially at the points of engagement between said wall and said tension member ends.

3. The method of fabricating a brake beam having a truss structure comprising the steps of offsetting a portion of the front wall of a channel-section compression member between the spaced webs thereof to form pockets in said wall, then inserting the ends of a tension member into respective pockets in abutment with respective portions, then fusing said ends to said portions by welding through the sides of said portions remote from the ends, and then connecting a brake head to said structure.

4. In a brake beam truss structure, a channel-section compression member of generally constant cross-sectional area throughout its length and having spaced webs and an intervening front wall with rearwardly offset end portions between said webs and curved transversely of said wall to provide pockets therein, a round bar tension member of substantially uniform cross section throughout its length and having ends within respective pockets seated tangentially against the inner surfaces thereof, and welds through said end portions at the areas of engagement of said portions with said tension member ends and fused with said portions and ends.

5. In a brake beam of truss type, a compression member of generally constant cross-sectional area throughout its length and having top and bottom webs and an intervening substantially vertical front wall with arcuate sections at its extremities curved transversely of said compression member and defining pockets extending longitudinally of said wall inwardly of the respective extremities thereof, a round bar tension member of substantially uniform cross section throughout its length and having its ends received within said pockets and tangentially seated against the adjacent surfaces of said sections, welds through said sections extending longitudinally of said compression member and connecting said sections with said ends, and brake heads secured to said compression member.

6. In a brake beam of truss type, a compression member having offset portions formed and arranged to provide a substantially semicylindrical pocket at each end of said member, a round bar tension member of a diameter lesser than that of said pockets having an end received within each pocket and in line engagement with the interior surface thereof longitudinally of said compression member, a weld connection between each tension member end and adjacent portion along said line of engagement, and a brake head secured to one of said members.

7. In a brake beam of truss type, a compression member having a wall with an offset section providing a pocket recessed within said wall, and a tension member having a portion in said pocket and having a substantially straight line contact with the adjacent surface of said section within said pocket and a substantially straight line weld extending through said section and into said portion and fused therewith.

8. In a brake beam, a compression member having spaced webs and an intervening front wall with a rearwardly offset portion providing a pocket, a tension member having an end portion extending into said pocket, and a weld through said offset portion fused with both of said portions.

9. In a brake beam, a truss structure including a compression member of generally constant cross section throughout its length and comprising a wall with an offset portion providing a pocket, a tension member having a segment within said pocket and seated against said portion, a weld applied through said portion and fused therewith and with said segment, and a brake head connected to said structure.

10. In a brake beam, a compression member having spaced webs and an intervening wall with offset portion curved transversely of said member between said webs and providing pockets, a tension member having sections within said pockets and seated against adjacent sides of the respective portions, and a weld fused with each portion and the adjacent section interconnecting the same.

11. A method of making a brake beam truss structure having a channel section compression member and a tension member with an arcuate end segment, comprising the steps of deforming a portion of one of the walls of said compression member to form a pocket therein with an internal curved surface of slightly larger radius than that of the external face of said segment, then inserting said segment into said pocket and seating the face thereon tangentially against said surface to provide an area of contact and contiguous shallow space areas between said face and said surface, then positioning said members so that the side of said portion remote from said tension member segment faces upwardly, and then fusing said portion and said segment to provide a unitary structure by melting said portion and segment and applying weld along said area of contact through the side of said portion remote from said segment whereupon any run-off metal is caused to flow in rapid-cooling thin sheets into said space areas to fill said space areas and thereby prevent further run off.

12. A brake beam comprising a brake head including a front wall with securing means for associated brake shoe means, a rear wall projecting angularly from said front wall, top and bottom walls defining a pocket with said rear wall, a compression member comprising a front web in said pocket and top and bottom webs projecting rearwardly from said front web and secured to said first-mentioned top and bottom webs, and a tension member projecting into said pocket and welded to said front web therewithin.

LOREN L. WHITNEY.

REFERENCES CITED

The following references are of record in the file of this patent:

UNITED STATES PATENTS

| Number | Name | Date |
|---|---|---|
| 867,184 | Baker | Sept. 24, 1907 |
| 990,938 | Williams, Jr. | May 2, 1911 |
| 2,356,720 | Aurien et al. | Aug. 22, 1944 |

FOREIGN PATENTS

| Number | Country | Date |
|---|---|---|
| 140,643 | British | Apr. 1, 1920 |